(12) United States Patent
Matsumura et al.

(10) Patent No.: US 11,630,443 B2
(45) Date of Patent: Apr. 18, 2023

(54) PRODUCTION SYSTEM, COMMUNICATION METHOD, AND INFORMATION STORAGE MEDIUM

(71) Applicant: Kabushiki Kaisha Yaskawa Denki, Kitakyushu (JP)

(72) Inventors: Isamu Matsumura, Kitakyushu (JP); Toshinobu Kira, Kitakyushu (JP); Yasufumi Yoshiura, Kitakyushu (JP); Takaaki Shogaki, Kitakyushu (JP); Hirotaka Niimi, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 0 days.

(21) Appl. No.: 17/179,364

(22) Filed: Feb. 18, 2021

(65) Prior Publication Data

US 2021/0255604 A1    Aug. 19, 2021

(30) Foreign Application Priority Data

Feb. 19, 2020 (JP) .............................. JP2020-026176

(51) Int. Cl.
*G05B 19/418* (2006.01)
*G06F 9/54* (2006.01)

(52) U.S. Cl.
CPC ..... *G05B 19/4183* (2013.01); *G05B 19/4185* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 10,700,924 B2* | 6/2020 | Gibson | H04L 67/10 |
| 2010/0208755 A1 | 8/2010 | Shimamura et al. | |
| 2012/0300794 A1 | 11/2012 | Hall et al. | |
| 2014/0336785 A1* | 11/2014 | Asenjo | G05B 19/4185 700/17 |
| 2018/0272528 A1* | 9/2018 | Kida | G05B 19/042 |
| 2019/0041830 A1 | 2/2019 | Yarvis et al. | |
| 2019/0182106 A1* | 6/2019 | Gibson | H04L 67/18 |
| 2019/0342886 A1* | 11/2019 | Osagawa | H04L 67/12 |
| 2019/0394098 A1* | 12/2019 | Saini | H04L 43/04 |
| 2020/0036786 A1 | 1/2020 | Yoneda et al. | |

(Continued)

FOREIGN PATENT DOCUMENTS

| | | |
|---|---|---|
| JP | 2004242031 A | 8/2004 |
| JP | 2016063236 A | 4/2016 |
| JP | 2018064245 A | 4/2018 |

(Continued)

OTHER PUBLICATIONS

Search Report dated Jun. 21, 2021, for corresponding EP Patent Application No. 21157109.6 pp. 1-11.

(Continued)

*Primary Examiner* — Umut Onat
(74) *Attorney, Agent, or Firm* — HEA Law PLLC

(57) ABSTRACT

Provided is a production system including: a first industrial machine; and a second industrial machine configured to periodically communicate to and from the first industrial machine. The second industrial machine is configured to transmit its data to the first industrial machine through use of each of a plurality of periodic regions included in one period.

16 Claims, 9 Drawing Sheets

(56) References Cited

U.S. PATENT DOCUMENTS

2020/0244594 A1    7/2020  Yoneda

FOREIGN PATENT DOCUMENTS

| JP | 2019062467 A | 4/2019 | | |
|---|---|---|---|---|
| WO | WO-2019106079 A1 | * | 6/2019 | ............. G05B 17/02 |

OTHER PUBLICATIONS

Shaw Robert et al.: "An Introduction to FlexRay as an Industrial Network", Jul. 1, 2008, pp. 1849-1854, XP055812010.
Office Action dated Apr. 13, 2021, for corresponding JP Patent Application No. 2020-026176 with partial English translation pp. 1-6.

* cited by examiner

FIG.5

| BYTE | COMMAND | RESPONSE |
|---|---|---|
| 0 | COMMAND 1 | RESPONSE 1 |
| 1 | COMMAND 2 | RESPONSE 2 |
| 2 | COMMAND 3 | RESPONSE 3 |
| 3 | | |
| 4 | COMMAND 4 | RESPONSE 4 |
| 5 | | |
| 6 | | |
| 7 | | |
| 8 | COMMAND 5 | RESPONSE 5 |
| 9 | | |
| 10 | | |
| 11 | | |
| 12 | COMMAND 8 | RESPONSE 8 |
| 13 | | |
| 14 | | |
| 15 | | |
| 16 | COMMAND 7 | RESPONSE 7 |
| 17 | | |
| 18 | | |
| 19 | | |
| 20 | COMMAND 8 | RESPONSE 8 |
| 21 | | |
| 22 | | |
| 23 | | |
| 24 | COMMAND 9 | RESPONSE 9 |
| 25 | | |
| 26 | | |
| 27 | | |
| 28 | COMMAND 10 | RESPONSE 10 |
| 29 | | |
| 30 | | |
| 31 | | |

PRODUCTION SYSTEM, COMMUNICATION METHOD, AND INFORMATION STORAGE MEDIUM

CROSS-REFERENCE TO RELATED APPLICATION

The present disclosure contains subject matter related to that disclosed in Japanese Patent Application JP2020-026176 filed in the Japan Patent Office on Feb. 19, 2020, the entire contents of which are hereby incorporated by reference.

BACKGROUND OF THE INVENTION

1. Field of the Invention

The embodiments disclosed herein relate to a production system, a communication method, and an information storage medium.

2. Description of the Related Art

In JP 2004-242031 A, there is described a configuration in which, in a production system configured to cause periodic transmission data to be transmitted and received at predetermined transmission cycles between a first industrial machine and a second industrial machine, the second industrial machine transmits and receives non-periodic transmission data, which is not required to be periodically transmitted, in a free time period in which the periodic transmission data is not transmitted or received.

SUMMARY OF THE INVENTION

According to one aspect of the present disclosure, there is provided a production system including: a first industrial machine; and a second industrial machine configured to periodically communicate to and from the first industrial machine, wherein the second industrial machine includes a transmission module configured to transmit its data to the first industrial machine through use of each of a plurality of periodic regions included in one period.

BRIEF DESCRIPTION OF THE DRAWINGS

FIG. 5 is a table for showing data formats of data transmitted and received in a communication phase for periodic communication.

DESCRIPTION OF THE EMBODIMENTS

From a viewpoint of the inventors, in a production system in which a first industrial machine and a second industrial machine periodically communicate to and from each other, a communication region for the periodic communication has been used to transmit and receive data for control, and a communication region for non-periodic communication has been used to transmit and receive other data. However, the communication region for the non-periodic communication is not dedicated to certain industrial machines, and industrial machines to use the communication region for the non-periodic communication and purposes of those usages are not determined. Moreover, the speed of the communication region for the non-periodic communication is also relatively low. Accordingly, it is not possible to guarantee a time period required to transmit the data other than the data for control. As a result of extensive research and development for guaranteeing, for example, the time period required to transmit the data, the inventors have conceived a novel and original production system and the like. A detailed description is now given of the production system and the like according to an embodiment of the present disclosure.

1. Overall Configuration of Production System

Figure 1:
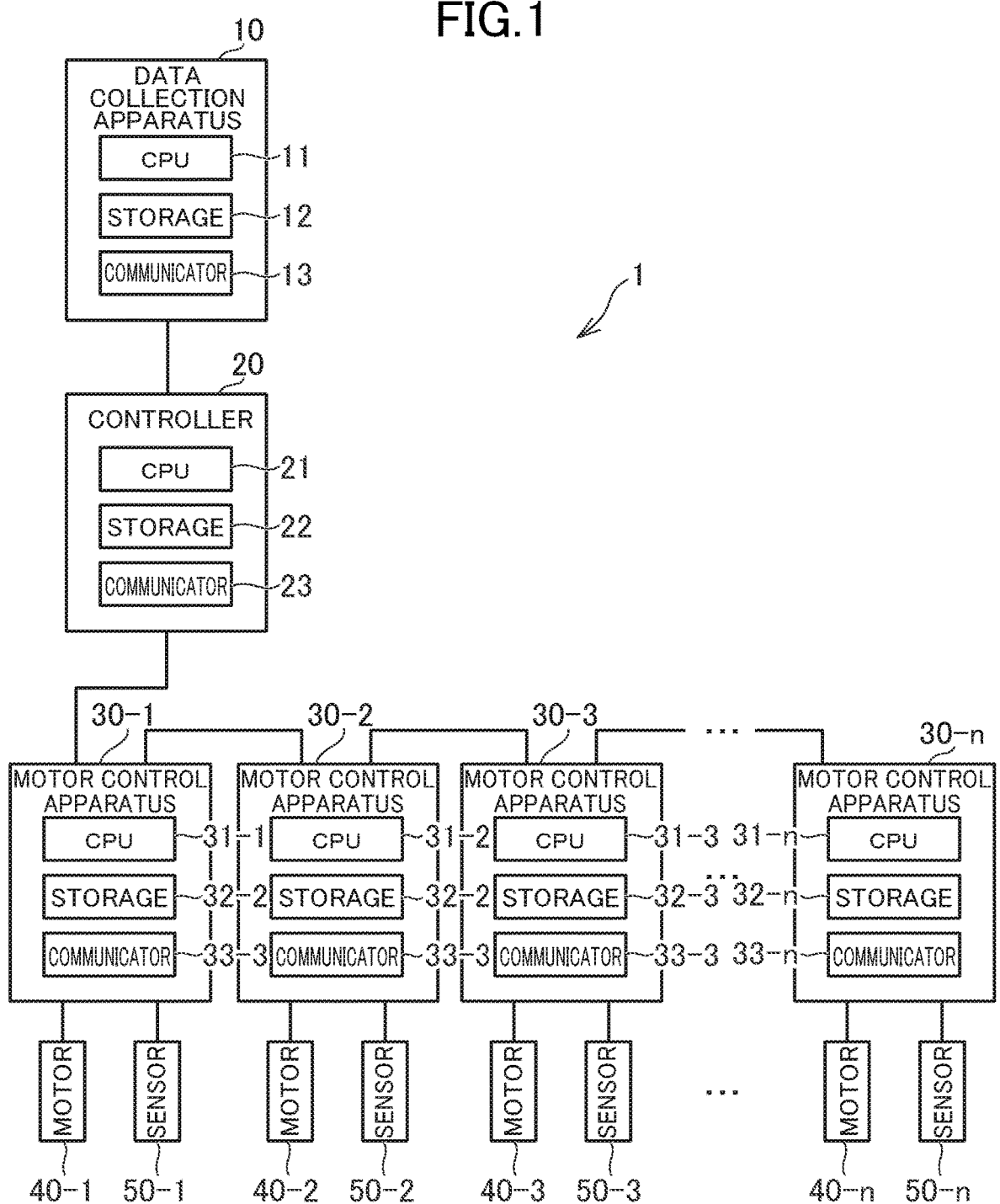
FIG. 1 is a diagram for illustrating an example of an overall configuration of a production system according to an embodiment of the present disclosure.

FIG. 1 is a diagram for illustrating an example of an overall configuration of the production system according to the embodiment. As illustrated in FIG. 1, a production system 1 includes a data collection apparatus 10, a controller 20, motor control apparatus 30-1 to 30-$n$, motors 40-1 to 40-$n$, and sensors 50-1 to 50-$n$. The symbol "n" represents a natural number, and in the case of FIG. 1, "n" is any integer equal to or larger than four.

In this embodiment, when it is not required to particularly distinguish the motor control apparatus 30-1 to 30-$n$, the motors 40-1 to 40-$n$, and the sensors 50-1 to 50-$n$ from one another, the motor control apparatus 30-1 to 30-$n$ are generally referred to as "motor control apparatus 30," the motors 40-1 to 40-$n$ are generally referred to as "motor 40," and the sensors 50-1 to 50-$n$ are generally referred to as "sensor 50." Similarly, when it is not required to particularly distinguish the CPUs 31-1 to 31-$n$, the storages 32-1 to 32-$n$, and the communicators 33-1 to 33-$n$ from one another, the CPUs 31-1 to 31-$n$ are generally referred to as "CPU 31," the storages 32-1 to 32-$n$ are generally referred to as "storage 32," and the communicators 33-1 to 33-$n$ are generally referred to as "communicator 33."

The data collection apparatus 10 is a computer configured to collect data. The data collection apparatus 10 includes a CPU 11, a storage 12, and a communicator 13. The CPU 11 includes at least one processor. The storage 12 includes a RAM, an EEPROM, and a hard disk drive, and is configured to store various programs and data. The CPU 11 is configured to execute various types of processing based on those programs and data. The communicator 13 includes a communication interface for wired communication or wireless communication, and is configured to communicate to and from other apparatus.

The controller 20 is an apparatus configured to control the motor control apparatus 30. The controller 20 is an example of a first industrial machine. Accordingly, a portion described as "controller 20" can be replaced by "first industrial machine" in this embodiment. The industrial machine is a general name of a machine configured to support or take over work executed by humans, and peripheral machines of the machine. For example, in addition to the controller 20, the motor control apparatus 30 described later corresponds to the industrial machine. In addition, for example, a robot controller, an industrial robot, an inverter, a converter, a machine tool, and a programmable logic controller (PLC) correspond to the industrial machine.

In this embodiment, description is given of a case in which the controller 20 controls four or more motor control apparatus 30, but the number of motor control apparatus 30 to be controlled by the controller 20 may be any number, and may be, for example, three or less. Moreover, for example, not only the motor control apparatus 30 but also sensors, input/output devices, and the like may be connected to the controller 20. Further, for example, the production system 1 may include a plurality of controllers 20. For example, the controller 20 includes a CPU 21, a storage 22, and a communicator 23. The physical configuration of each of the CPU 21, the storage 22, and the communicator 23 is the same as that of each of the CPU 11, the storage 12, and the communicator 13.

The motor control apparatus 30 is an apparatus configured to control the motor 40. The motor control apparatus 30 is an example of a second industrial machine. Accordingly, a portion described as "motor control apparatus 30" can be replaced by "second industrial machine" in this embodiment. Description is given of a case in which the production system 1 according to this embodiment includes a plurality of second industrial machines, but the number of second industrial machines may be only one.

For example, the second industrial machine is an industrial machine configured to periodically communicate to and from the first industrial machine. The meaning of the "industrial machine" is as described above. The second industrial machine is not required to always communicate to and from the first industrial machine periodically, and may communicate to and from the first industrial machine non-periodically. It is only required that the first industrial machine and the second industrial machine be capable of periodically communicating to and from each other. In this embodiment, the first industrial machine is a machine provided on a data reception side (apparatus being a transmission destination of data) from the second industrial machine. Moreover, the second industrial machine is a machine provided to a data transmission side (machine being a transmission source of data). The second industrial machine may also be considered as a machine configured to generate data, or a machine whose operation is to be analyzed.

In this embodiment, description is given of a case in which the first industrial machine is a master machine configured to transmit a command, and the second industrial machine is a slave machine configured to operate in accordance with the command. However, the first industrial machine may be the slave machine, and the second industrial machine may be the master machine. Further, the first industrial machine and the second industrial machine are not required to be in the master/slave relationship. In other words, the master/slave relationship or a hierarchical relationship may not exist between the first industrial machine and the second industrial machine.

The "master machine" is a machine configured to control the slave machine. In other words, the master machine is a machine configured to acquire data from the slave machine. The "slave machine" is a machine to be controlled by the master machine. In other words, the slave machine is a machine configured to transmit the own operation state to the master machine. In this embodiment, the motor control apparatus 30 operates based on the command from the controller 20. Thus, the controller 20 corresponds to the master machine, and the motor control apparatus 30 corresponds to the slave machine.

The motor control apparatus 30 may also be referred to as "servo amplifier" or "servopack" (trademark). In this embodiment, description is given of a case in which the motor control apparatus 30 controls one motor 40, but the motor control apparatus 30 may control a plurality of motors 40. Further, not only the motor 40 and the sensor 50, but also other machines, for example, an input/output device, may be connected to the motor control apparatus 30.

As illustrated in FIG. 1, the motor control apparatus 30-1 to 30-$n$ are connected in series to each other in a predetermined connection order. The connection order is an order counted from the controller 20. The connection order may also be considered as a hierarchy. The connection order of the motor control apparatus 30-$k$ ("k" is an integer equal to or larger than 1 and equal to or smaller than "n") is k-th. The serial connection corresponds to a state in which at least one motor control apparatus 30 is connected to the motor control apparatus 30 at least one of an upper level or a lower level thereof. A connection form of so-called "multi-drop connection," "cascade connection," or "daisy-chain connection" is an example of the serial connection. For example, the motor control apparatus 30 includes a CPU 31, a storage 32, and a communicator 33. The physical configuration of each of the CPU 31, the storage 32, and the communicator 33 is the same as that of each of the CPU 11, the storage 12, and the communicator 13.

The motor control apparatus 30 is configured to control a current directed to the motor 40 connected through power lines based on the command received from the controller 20. The motor 40 may be a motor of a rotary type or a linear type. The sensor 50 is a sensor capable of detecting a physical quantity, and is, for example, a motor encoder, a torque sensor, a temperature sensor, a force sensor, a vision sensor, a motion sensor, a gyro sensor, an acceleration sensor, or the like. In FIG. 1, one sensor 50 corresponds to one motor control apparatus 30. However, a plurality of sensors 50 may be connected to one motor control apparatus.

Programs and data described as being stored in each of the data collection apparatus 10, the controller 20, and the motor control apparatus 30 may be supplied through the network. Moreover, the hardware configurations of the data collection apparatus 10, the controller 20, and the motor control apparatus 30 are not limited to the above-mentioned examples, and various types of hardware can be applied. For example, a reader (for example, optical disc drive or memory card slot) configured to read a computer-readable information storage medium and an input/output unit (for example, USB terminal) configured to directly connect to an external device may be included. In this case, programs and data stored in the information storage medium may be supplied through the reader or the input/output unit. Moreover, for example, an integrated circuit called "ASIC" or "FPGA" may be included.

2. Overview of Production System

In the production system 1, the periodic communication is executed between the controller 20 and the motor control apparatus 30. The periodic communication is communication executed cyclically (periodically). In other words, the periodic communication is communication which has a communication procedure in one period defined in advance, and is executed in every constant period in accordance with the communication procedure. In this embodiment, the periodic communication is executed on an industrial network (including so-called "field network") configured to connect the controller 20 and the motor control apparatus 30 to each other.

Figure 2:
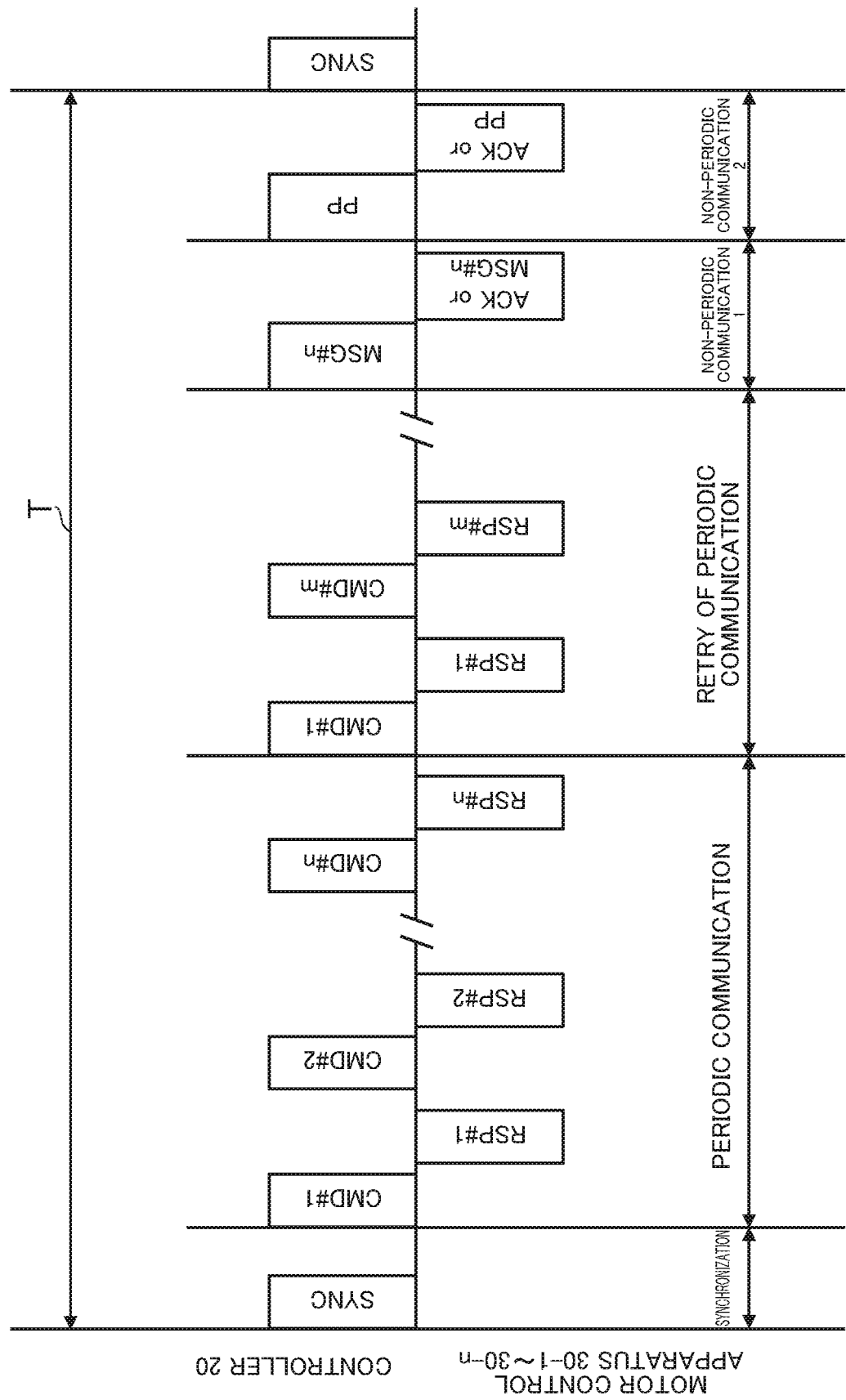
FIG. 2 is a diagram for illustrating a related-art communication procedure in one period.

FIG. 2 is a diagram for illustrating a related-art communication procedure in one period. As illustrated in FIG. 2, in the periodic communication, a duration T of one period is defined in advance. The duration T of one period may have any length. The duration T may have a length of, for example, approximately some tens of microseconds to approximately some hundreds of microseconds, or may be equal to or longer than this length or equal to or shorter than this length. The duration T of one period is only required to be defined in accordance with the number of motor control apparatus 30 (so called "number of axes"). For example, as the number of motor control apparatus 30 increases, the duration T increases. For example, the controller 20 counts up the time stored in the storage 22, to thereby determine whether or not a start time point of each period has arrived (whether or not the duration T has elapsed).

In the example of FIG. 2, communication phases arrive in an order of a synchronization, the periodic communication, a retry of the periodic communication, and the non-periodic communication in one period. In the communication phase for the synchronization, the controller 20 and the motor control apparatus 30 are synchronized with each other ("SYNC" of FIG. 2). A time managed by the controller 20 and a time managed by the motor control apparatus 30 are matched with each other through the synchronization. For example, each of the controller 20 and the motor control apparatus 30 uses a timer to manage the time.

The periodic communication is executed in the communication phase for the periodic communication. For example, a command is transmitted from the controller 20 to the motor control apparatus 30. The command may also be considered as output from the controller 20 to the motor control apparatus 30. The motor control apparatus 30 receives the command from the controller 20, executes the command, and transmits a response to the controller 20. The response may also be considered as input from the motor control apparatus 30 to the controller 20. The controller 20 does not, in principle, receive, in a period from the transmission of the command to the reception of the response, other data from the motor control apparatus 30. Accordingly, the communication phase for the periodic communication in this embodiment may also be considered as a communication phase for synchronous communication. For example, the command in the communication phase for the periodic communication is processed as a synchronous task.

The controller 20 sequentially communicates to and from each of the motor control apparatus 30-1 to 30-n. For example, when the communication phase for the periodic communication arrives, the controller 20 transmits a command ("CMD #1" of FIG. 2) to the motor control apparatus 30-1, which is the first in the communication order. The motor control apparatus 30-1 receives the command, executes the command, and transmits a response ("RSP #1" of FIG. 2) to the controller 20. In this case, the motor control apparatus 30-2 to 30-n are arranged at levels lower than the level of the motor control apparatus 30-1, and does not thus communicate to and from the controller 20.

After that, the controller 20 transmits a command ("CMD #2" of FIG. 2) to the motor control apparatus 30-2, which is the second in the communication order. The motor control apparatus 30-1 is arranged between the controller 20 and the motor control apparatus 30-2, and the motor control apparatus 30-1 thus transfers the command received from the controller 20 to the motor control apparatus 30-2. The motor control apparatus 30-2 receives the transferred command, executes the command, and transmits a response ("RSP #2" of FIG. 2) to the controller 20. The motor control apparatus 30-1 transfers the response received from the motor control apparatus 30-2 to the controller 20. In this case, the motor control apparatus 30-3 to 30-n are arranged at levels lower than the level of the motor control apparatus 30-2, and does not thus communicate to and from the controller 20.

After that, the communication to and from the controller 20 is similarly executed sequentially from the motor control apparatus 30 upper in the connection order. Other motor control apparatus 30 arranged between the controller 20 and the motor control apparatus 30 being the communication target are only required to transfer the command to the motor control apparatus 30 being the communication target, and to transfer the response to the controller 20. In this embodiment, the communication order of the motor control apparatus 30-1 to 30-n matches the connection order, but the communication order and the connection order may not match each other. For example, the motor control apparatus 30-2 may communicate to and from the controller 20 first in the order.

In the communication phase for the retry, communication having failed in the communication phase for the periodic communication is retried. In the example of FIG. 2, there is illustrated a case in which the communication between the controller 20 and the motor control apparatus 30-1 and the communication between the controller 20 and the motor control apparatus 30-m ("m" is an integer equal to or larger than 2 and equal to or smaller than "n") fail, and are thus retried. However, when a failed communication does not exist, the retry is not executed.

The non-periodic communication is executed in the communication phase for the non-periodic communication. The non-periodic communication is communication that is not the periodic communication, and is communication that is not cyclically (periodically) executed. The non-periodic communication is sometimes called "message communication." For example, the non-periodic communication is executed in a free time period that is not the communication phase for the periodic communication. For example, the speed of the non-periodic communication is lower than that of the periodic communication, and the size of data transmitted at once is larger than that of the periodic communication. In the non-periodic communication, data having a size of approximately some hundreds of bytes is non-periodically read and written at once. For example, in the non-periodic communication, the controller 20 does not communicate to and from all of the motor control apparatus 30, but communicates to and from a part of the motor control apparatus 30. Accordingly, in the non-periodic communication, there exist motor control apparatus 30 that do not communicate to and from the controller 20.

In the example of FIG. 2, in the non-periodic communication, the controller 20 specifies the motor control apparatus 30 being an opposite party of the communication, and transmits a command (for example, "MSG #n" in the first non-periodic communication of FIG. 2) to this motor control apparatus 30. The motor control apparatus 30 being the opposite party of the communication receives the command, executes the command, and transmits a response (for example, "ACK or MSG #n" in the first non-periodic communication of FIG. 2) to the controller 20. When anyone of the motor control apparatus 30-2 to 30-n is an opposite party of the communication, it is only required that the transfer be executed as in the periodic communication.

In the non-periodic communication, the controller 20 may not communicate to and from a specific motor control apparatus 30, but may execute broadcast communication to and from all of the motor control apparatus 30. Moreover, in the example of FIG. 2, there is illustrated a case in which there exist two communication phases for the non-periodic communication, but the number of the communication phases for the non-periodic communication may be only one, or may be three or more. In a period in which the non-periodic communication is not particularly required, there may not exist the communication phase for the non-periodic communication. Moreover, for other communication phases, there may similarly exist a plurality of the same communication phases.

As illustrated in FIG. 2, when a certain period ends, a next period starts. When the next period starts, the communication phases arrive in the order of the synchronization, the periodic communication, the retry of the periodic communication, and the non-periodic communication. After that, the periodic communication is repeated between the controller 20 and the motor control apparatus 30.

A command for a trace start in addition to the commands for controlling the motor 40 is also transmitted from the controller 20 to the motor control apparatus 30. For example, when the motor control apparatus 30 receives the command for the trace start from the controller 20, the motor control apparatus 30 starts a trace when a predetermined trigger condition is satisfied, to thereby generate trace data. In this embodiment, the motor control apparatus 30 not only generates the trace data, but also executes a primary analysis of the trace data, to thereby generate primary analysis data.

The motor control apparatus 30 transmits, to the controller 20, data (hereinafter referred to as "data to be transmitted") formed by unifying the trace data and the primary analysis data. With this respect, when the communication region for the non-periodic communication is used to transmit the data to be transmitted on all of the motor control apparatus 30, a long time period is required for the transmission, and the duration of the period may not be guaranteed.

For example, when the data size of the data to be transmitted is 8 kilobytes (that is, 8*1,024=8,192 bytes), and the maximum message size of the non-periodic communication is 512 bytes, 16 times of transmission through the non-periodic communication are required to transmit the entire data to be transmitted on one motor control apparatus 30. When the non-periodic communication takes 10 ms per time, it takes 160 ms to transmit the data to be transmitted on one motor control apparatus 30. When 30 motor control apparatus 30 are connected (when the value of "n" is 30), it takes 4.8 seconds to transmit the data to be transmitted on all of the motor control apparatus 30. The non-periodic communication is used also for other purposes, and it may take 4.8 seconds or longer to transmit the data to be transmitted. Accordingly, when the non-periodic communication is used, a long time period is required to transmit the data to be transmitted. Further, the time period required to transmit the data to be transmitted is not guaranteed, and it is thus not possible to timely read out the data to be transmitted.

Thus, in this embodiment, one motor control apparatus 30 is considered as two slave machines, and the periodic communication to and from a virtual second slave machine is used as transmission and reception of the data to be transmitted.

Figure 3:
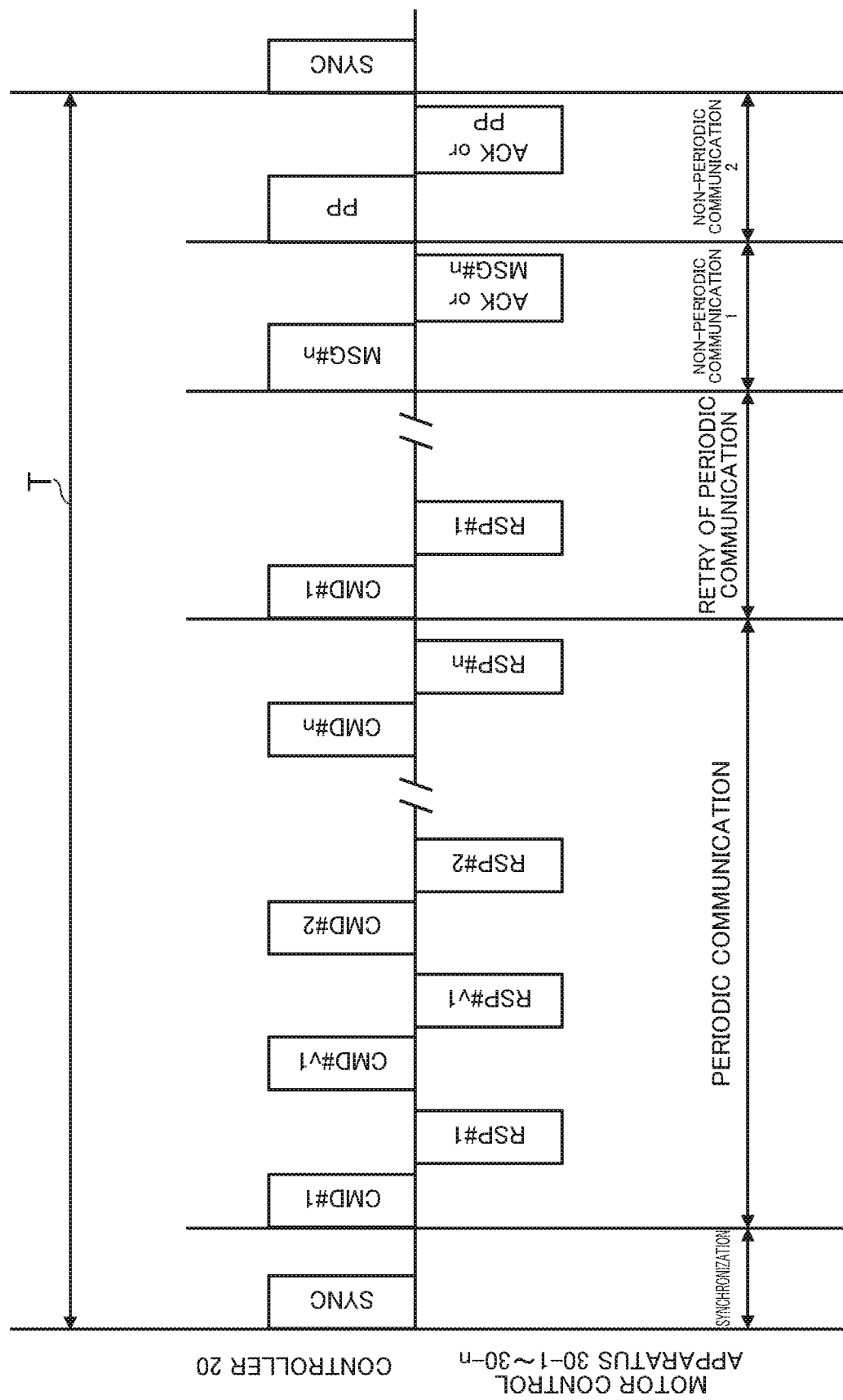
FIG. 3 is a diagram for illustrating a communication procedure in one period in the embodiment.

FIG. 3 is a diagram for illustrating a communication procedure in one period in this embodiment. In FIG. 3, there is illustrated the communication procedure in a case in which the motor control apparatus 30 transmits the data to be transmitted to the controller 20. As illustrated in FIG. 3, for example, when the communication phase for the periodic communication arrives, the controller 20 transmits a command ("CMD #1" of FIG. 3) to the motor control apparatus 30-1, which is the first in the connection order. The motor control apparatus 30-1 receives the command, executes the command, and transmits a response ("RSP #1" of FIG. 3) to the controller 20. This point of the communication procedure is the same as in the related-art communication procedure.

After that, the controller 20 transmits a command ("CMD #v1" of FIG. 3) to a virtual slave machine corresponding to the motor control apparatus 30-1. This command "CMD #v1" is different from the above-mentioned command "CMD #1." For example, while the command "CMD #1" is a command for control for the motor 40, a command "CMD #v1" is a command for instructing transmission of the data to be transmitted. The motor control apparatus 30-1 receives the command, executes the command, and transmits a response ("RSP #v2" of FIG. 3) as the virtual slave machine to the controller 20. This response includes each piece of data obtained by dividing the data to be transmitted into portions. A subsequent communication procedure is the same as that of FIG. 2.

For example, when the data size of the data to be transmitted is 8 kilobytes, and the communication region for the periodic communication is 32 bytes, 256 times of transmission are required to transmit the entire data to be transmitted on one motor control apparatus 30. When the duration T of each period is 125 μs, it takes 32 ms to transmit the data to be transmitted on one motor control apparatus 30.

The size of each piece of data to be transmitted and received through the periodic communication is small, but the controller 20 communicate to and from all of the motor control machine 30 in the periodic communication. Accordingly, even when 30 motor control apparatus 30 are connected (even when the value of "n" is 30), as long as the communication regions for the virtual slave machines can be set for all of the 30 motor control apparatus 30, it takes only 32 ms seconds to transmit the data to be transmitted on all of the motor control apparatus 30. That is, even when the size of the data to be transmitted is the same, the time period for the transmission is shorter than that in the case in which the communication region for the non-periodic communication is used. Further, in the periodic communication, the controller 20 communicates to and from all of the motor control apparatus 30, and the communication region dedicated to each of the motor control apparatus 30 is secured. Accordingly, the time period required to transmit the data to be transmitted is guaranteed, and it is thus possible to timely read out the data to be transmitted.

As described above, in this embodiment, the motor control apparatus 30 uses the communication region for the virtual slave machine to transmit the data to be transmitted on the motor control apparatus 30, to thereby reduce the time period required to transmit the data, and to thereby guarantee the required time period simultaneously. A detailed description is now given of the production system 1.

3. Functions to be Implemented in Production System

Figure 4:
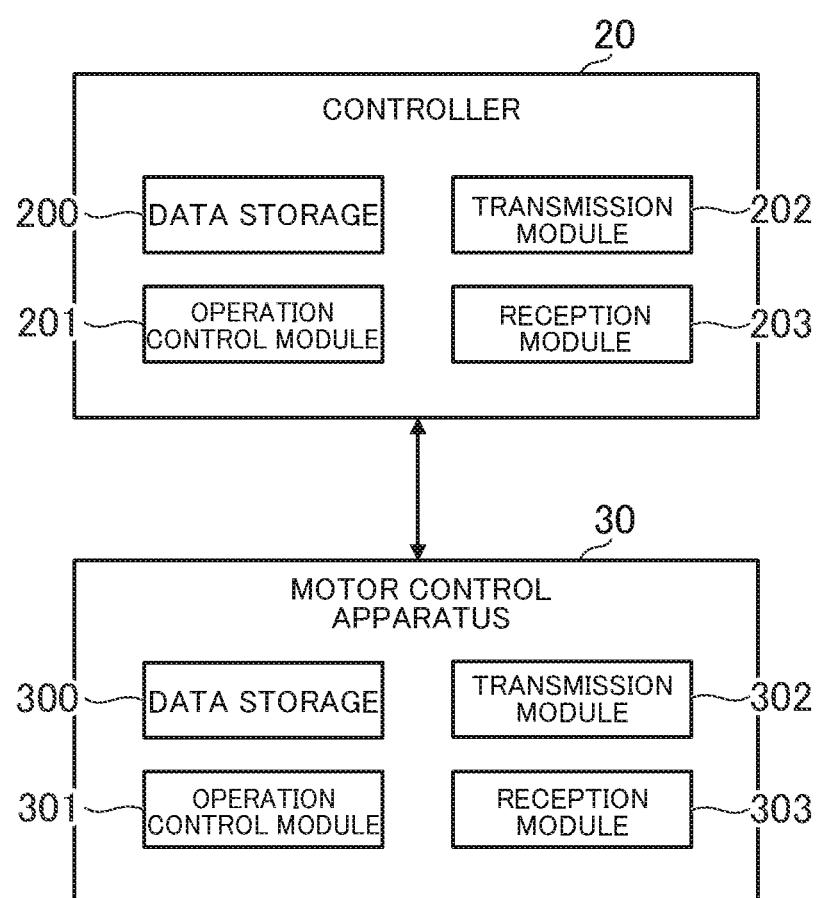
FIG. 4 is a functional block diagram for illustrating functions to be implemented in the production system.

FIG. 4 is a functional block diagram for illustrating functions to be implemented in the production system 1. The functions to be implemented in each of the controller 20 and the motor control apparatus 30 are now described.

[3-1. Functions to be Implemented in Controller]

As illustrated in FIG. 4, in the controller 20, a data storage 200, an operation control module 201, a transmission module 202, and a reception module 203 are implemented. The data storage 200 is implemented mainly by the storage 22. The operation control module 201, the transmission module 202, and the reception module 203 are implemented mainly by the CPU 21.

[Data Storage]

The data storage 200 is configured to store data required to control the motor control apparatus 30. For example, the data storage 200 stores: control programs in which command contents directed to the motor control apparatus 30 (operation contents of the motor control apparatus 30) are described; and parameters to be stored in the motor control apparatus 30.

Moreover, for example, the data storage 200 stores data required for the periodic communication. The data includes information such as the duration T of each period and a timer indicating the current time, information such as formats of the data to be transmitted and received in the respective communication phases in one period. When the communication procedure described with reference to FIG. 2 is described in a control program, the control program is also an example of data required for the periodic communication. The communication procedure may be described in another program.

FIG. 5 is a table for showing data formats of the data transmitted and received in the communication phase for the periodic communication. In FIG. 5, there are shown a data format of the commands transmitted by the controller 20 and a data format of the responses transmitted by the motor control apparatus 30. In this embodiment, description is given of a case in which the data size of the command and the data size of the response are the same, but the data sizes may be different from each other.

A data region including 32 bytes defined by the data formats shown in FIG. 5 is hereinafter referred to as "periodic region." The data region for the command including 32 bytes is an example of the periodic region. The data region for the response including 32 bytes is also an example of the periodic region. The periodic region is a communication region for the periodic communication. For example, the communication region is a unit of data (data region) to be transmitted and received. A so-called "packet" or "frame" is an example of the communication region. In this embodiment, it is assumed that the data size of the periodic region is fixed, but the data size of the periodic region may be variable. The communication region may not mean a unit of data, but may mean a period in which the communication is executed (period in which data is transmitted and received). For example, the period of the communication phase for the periodic communication illustrated in FIG. 2 may be referred to as "periodic region."

In this embodiment, the periodic region is defined for each motor control apparatus 30. In the example of FIG. 2, in the communication phase for the periodic communication, each motor control apparatus 30 communicates to and from the controller 20 once, to thereby transmit and receive the data of 32 bytes shown in FIG. 5. As a result, in one period, one periodic region exists for each motor control apparatus 30.

As shown in FIG. 5, the data format of the command is configured such that the periodic region including 32 bytes are partitioned into ten regions, and the content of the command is stored in each of the ten regions. For example, the content of the command is described in the control program stored in the data storage 200. The content of the command may be any content relating to an operation of the motor control apparatus 30, and may be, for example, a content relating to the direction and speed of the motor 40, whether or not the motor control apparatus 30 is to be maintained in a standby state without operating the motor 40, a type of data to be acquired by the motor control apparatus 30, or the like.

In the data storage example of FIG. 5, a command 1 is stored in the first one byte (0th byte of FIG. 5), and a command 2 is stored in the following one byte (first byte of FIG. 5). A command 3 is stored in the following two bytes (second and third bytes of FIG. 5), and thereafter, a command 4 to a command 10 are stored in a data region partitioned into portions each having four bytes. In the periodic region for the commands, there may exist data regions available for any purposes (regions corresponding to an unspecified region described later).

Moreover, for example, the data format of the response is configured such that the periodic region including 32 bytes are partitioned into ten regions, and a content of the response is stored in each of the ten regions. The content of the response is a content corresponding to the command transmitted by the controller 20. For example, the content of the response is a physical quantity detected by the sensor 50, still image data or motion image data taken by the sensor 50, internal information on the motor control apparatus 30, or the like.

For example, the physical quantity is position information (for example, number of rotations or rotational angle) of the motor 40 detected by the motor encoder, a torque value detected by the torque sensor, or temperature information detected by the temperature sensor. Moreover, for example, the still image data or the motion image data is data on an image taken by a camera (vision sensor). In the still image data or the motion image data, there is indicated a state of a workpiece, a state of the motor control apparatus 30, or a peripheral apparatus (for example, other motor control apparatus 30 or transfer machines) of the motor control apparatus 30. Moreover, for example, the internal information on the motor control apparatus 30 is a load ratio of the CPU 31, a status of use of the storage 32, or a status of use of the communicator 33.

In the data storage example of FIG. 5, a response 1 is stored in the first one byte (0th byte of FIG. 5), and a response 2 is stored in the following one byte (first byte of FIG. 5). A response 3 is stored in the following two bytes (second and third bytes of FIG. 5), and thereafter, a response 4 to a response 7 are stored in a data region partitioned into portions each having four bytes. The response 1 to the response 7 are contents that can be transmitted at once. For example, each of the response 1 to the response 7 is an instantaneous value of the physical quantity, the internal information, and the like described above. The instantaneous value is not a change represented in a form of a time series, but a value at a certain time point. The 20th byte and the following bytes (response 8 to response 10) of FIG. 5 correspond to a response region provided for the command, and are set as regions to which none is specified and a physical quantity and internal information can thus appropriately be specified in accordance with setting of servo control. When the response 8 to the response 10 are not distinguished from one another, the response 8 to the response 10 are hereinafter referred to as "unspecified regions."

The unspecified region is a region capable of storing any type of data. In other words, the unspecified region is a region that is available for an unspecified application, and is used to store a dynamically changing type of data. For example, a type of data specified by the controller 20 is stored in the unspecified region. When the controller 20 specifies the torque value, the torque value detected by the torque sensor is stored in the unspecified region. Moreover, for example, when the controller 20 specifies the image data, the image data generated by the camera is stored in the unspecified region. Data which cannot be stored in each unspecified region (data larger than four bytes) may be specified, and in this case, the data is divided into smaller portions each having four bytes, and each portion of data is stored in the unspecified region.

In this embodiment, the motor control apparatus 30 is considered as a plurality of slave machines, and there exist the periodic region corresponding to the real motor control apparatus 30 and the periodic region corresponding to the virtual motor control apparatus 30. Description is given of a case in which those periodic regions have the same data formats, but may have data formats different from each other or may have data formats different from each other in overall data size or in partitioning of each of the regions. For example, in the periodic region corresponding to the real motor control apparatus 30, the commands and the responses for controlling the motor control apparatus 30 and the motor 40 are stored. Moreover, for example, in the periodic region corresponding to the virtual motor control apparatus 30, the commands and the responses for transmitting and receiving the data to be transmitted are stored.

As described above, in the communication phase for the periodic communication, the periodic region is used to transmit and receive data. Meanwhile, in this embodiment, a data region to be used to store the data transmitted and received in the communication phase for the non-periodic communication is referred to as "non-periodic region." The non-periodic region is a communication region for the non-periodic communication. In this embodiment, it is assumed that the data size of the non-periodic region is variable, but the data size of the non-periodic region may be fixed. When the communication region does not mean a unit of data but means a period in which the communication is executed, the period of the communication phase for the non-periodic communication illustrated in FIG. 2 may be referred to as "non-periodic region."

For example, when only a specific motor control apparatus 30 executes the non-periodic communication to and from the controller 20, the non-periodic region exists for only this motor control apparatus 30. In the first communication phase for the non-periodic communication in the example of FIG. 2, the controller 20 and the motor control apparatus 30-$n$ communicate to and from each other, and only the non-periodic region for the motor control apparatus 30-$n$ thus exists. In the example of FIG. 2, the periodic region and the non-periodic regions exist in one period, but there may exist a period in which a non-periodic region does not exist.

The data stored in the data storage 200 is not limited to the above-mentioned example. For example, the data storage 200 may store basic information (such as apparatus names and IP addresses) on the motor control apparatus 30 to be controlled by the controller 20. Moreover, for example, the data storage 200 may store basic information (apparatus name and IP address) on the virtual slave machine corresponding to the motor control apparatus 30. Moreover, for example, the data storage 200 may store the trace data and the primary analysis data received from the motor control apparatus 30. Further, for example, the data storage 200 may store the physical quantities detected by the sensors directly connected to the controller 20.

[Operation Control Module]

The operation control module 201 is configured to execute the control program stored in the data storage 200, to thereby control the motor control apparatus 30. For example, a content of a command directed to the motor control apparatus 30 is described in a form of a time series in the control program. The operation control module 201 identifies the content of the command described in the control program corresponding to the motor control apparatus 30. The operation control module 201 generates data (data having 32 bytes of FIG. 5) including the identified content of the command. The generated data is transmitted by the transmission module 202 described later. A header portion exists in this data, which is not shown in FIG. 5, and it is assumed that address information for identifying the destination, for example, an IP address of the motor control apparatus 30 being the transmission destination, is stored in the header portion.

In this embodiment, the motor control apparatus 30 can acquire a plurality of types of data. The operation control module 201 is configured to specify at least one of the plurality of types of data. The type of data means a content represented by the data. For example, when the motor control apparatus 30 can acquire the position information detected by the motor encoder, the torque value detected by the torque sensor, and the temperature information detected by the temperature sensor, the number of types of data is three. Those types of data are data that may form a response, and are to be stored in, for example, the unspecified region. The types specified by the operation control module 201 are types to be acquired by the controller 20. The types to be specified may be defined in the control program, or may be defined in another program.

For example, when data of a type corresponding to an alarm having occurred in the motor control apparatus 30 is to be acquired, the operation control module 201 specifies the type of data corresponding to the alarm which has occurred. In this case, it is assumed that relationships each between an alarm code and a type of data to be acquired is stored in the data storage 200. This relationship may be defined in any data form. The relationship may be defined in, for example, a table form or a form of a numerical expression, or may be described as a part of a program code. When the operation control module 201 receives an alarm code of an alarm which has occurred from the motor control apparatus 30, the operation control module 201 refers to this relationship, and specifies a type of data corresponding to the alarm code.

In this embodiment, the periodic region includes the plurality of regions each capable of storing a part of the data to be transmitted, and the operation control module 201 is configured to specify at least one of the plurality of regions. A part of the data to be transmitted is each of the portions obtained by dividing the data to be transmitted into a plurality of portions. The region capable of storing a part of the data to be transmitted is a part of the regions of the periodic region. The data sizes of the respective plurality of regions may be the same, or may be different from one another. In this embodiment, the unspecified regions in the data format shown in FIG. 5 correspond to regions capable of storing a part of the data to be transmitted. Accordingly, portions described as "unspecified region" in this embodiment can be replaced by "region capable of storing a part of the data to be transmitted." The region specified by the operation control module 201 may be a region called by a name different from the unspecified region. For example, the operation control module 201 specifies a start byte and an end byte of the periodic region to be used.

In this embodiment, the controller 20 is able to communicate to and from a plurality of opposite parties of communication in one period, and the periodic region exists for each opposite party of communication in one period. The opposite party of communication is an apparatus that communicates to and from the controller 20. For example, a transmission destination of data transmitted by the controller 20 is an opposite party of communication. Moreover, for example, a transmission source of data received by the controller 20 is an opposite party of communication. In this embodiment, it is assumed that an order of the communication of the controller 20 to and from each of the opposite parties of communication is determined, but the order may not be particularly required to be determined. The numbers of periodic regions for respective opposite parties of communication may be the same as one another, or may be different from one another. The opposite party of communication includes one or more periodic regions.

[Transmission Module]

The transmission module 202 is configured to transmit any data to the motor control apparatus 30. For example, the transmission module 202 transmits data indicating the content of the command generated by the operation control module 201 to the motor control apparatus 30. The transmission module 202 transmits, to the motor control apparatus 30, data including identification information on the type specified by the operation control module 201. The transmission module 202 transmits, to the motor control apparatus 30, data including the identification information on the regions specified by the operation control module 201. In the communication phase for the periodic communication, the transmission module 202 stores data in the periodic region, and transmits the data to the motor control apparatus 30. In the communication phase for the non-periodic communication, the transmission module 202 stores data in the non-periodic region, and transmits the data to the motor control apparatus 30.

[Reception Module]

The reception module 203 is configured to receive any data from the motor control apparatus 30. For example, the reception module 203 receives data indicating the content of the response generated by an operation control module 301 described later from the motor control apparatus 30. The reception module 203 receives data of the type specified by the operation control module 201 from the motor control apparatus 30. The reception module 203 receives the data to be transmitted stored in the regions specified by the operation control module 201 from the motor control apparatus 30. In the communication phase for the periodic communication, the reception module 203 receives the data stored in the periodic region from the motor control apparatus 30. In the communication phase for the non-periodic communication, the reception module 203 receives the data stored in the non-periodic region from the motor control apparatus 30.

[3-2. Functions to be Implemented in Motor Control Apparatus]

As illustrated in FIG. 4, in the motor control apparatus 30, a data storage 300, the operation control module 301, a transmission module 302, and a reception module 303 are implemented. The data storage 300 is implemented mainly by the storage 32. The operation control module 301, the transmission module 302, and the reception module 303 are implemented mainly by the CPU 31.

[Data Storage]

The data storage 300 is configured to store data required to control the motor 40. For example, the data storage 300 stores a control program for the motor 40 and the parameters received from the controller 20. In the control program, a relationship between the content of the command and a content of an operation (for example, output to the motor 40) to be executed by the motor control apparatus 30 is described. Moreover, for example, the data storage 300 stores, as data required to execute the periodic communication, information on a timer indicating a current time and the like and information on the format of the data to be transmitted and received in each communication phase in one period. Moreover, for example, the data storage 300 stores the data to be transmitted including the trace data and the primary analysis data. When the trace data and the primary analysis data are being generated, the data storage 300 stores those pieces of data being generated.

Figure 6:
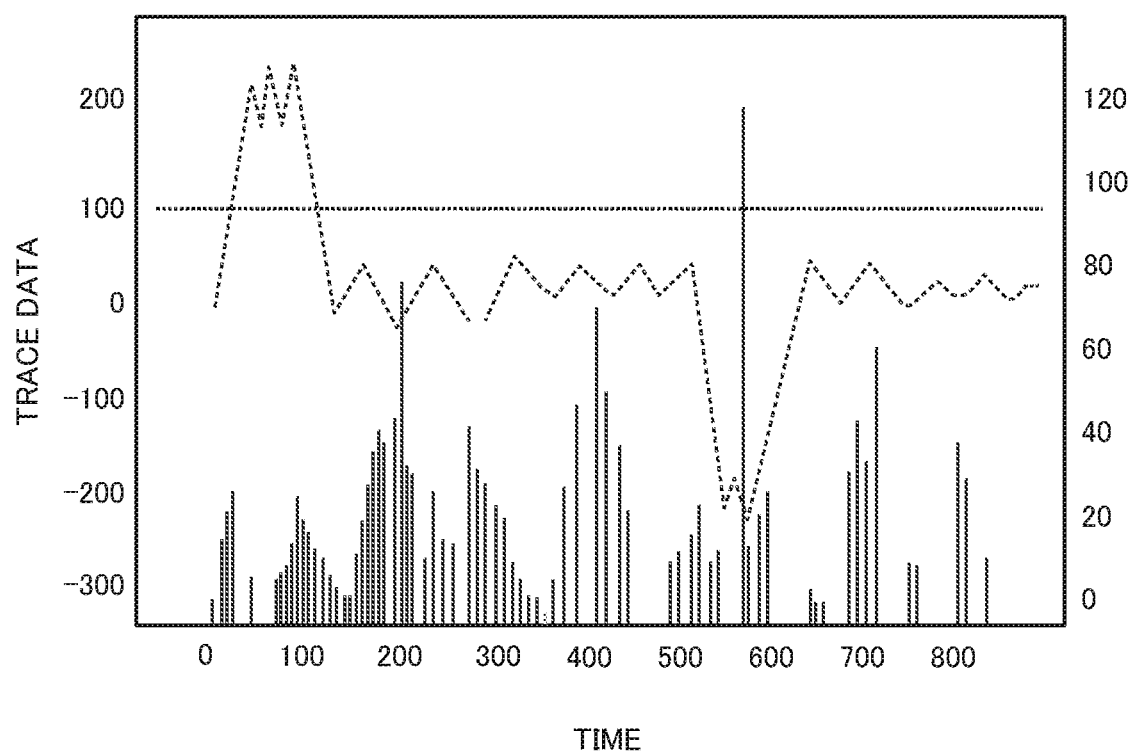
FIG. 6 is a graph for showing contents of trace data and primary analysis data.

FIG. 6 is a graph for showing contents of the trace data and the primary analysis data. In FIG. 6, the content of the trace data is indicated by the broken line, and the content of the primary analysis data is indicated by the solid line. For example, in the trace data, a physical quantity indicating the state of the motor 40 detected by the sensor 50 in a form of a time series is stored. The horizontal axis of the graph of FIG. 6 is a time axis. The vertical axis represents the physical quantity. Moreover, for example, in the primary analysis data, calculation results of predetermined calculation applied to the physical quantity included in the trace data are stored. In the example of FIG. 6, the data obtained through the primary analysis is shown. For example, when a threshold value (dotted line of FIG. 6) for the analyzed data is set, times when the analyzed value becomes equal to or larger than the threshold value may be included in the primary analysis data. The primary analysis data may not be information having a form of a time series.

Figure 7:
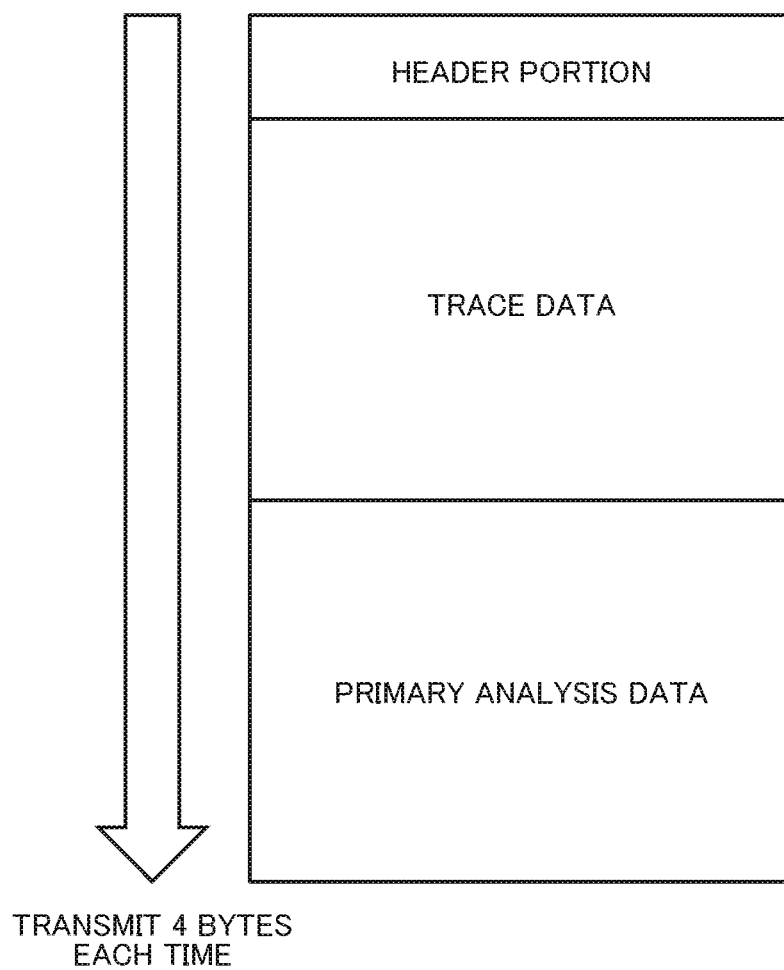
FIG. 7 is a diagram for illustrating an overall configuration of data to be transmitted.

FIG. 7 is a diagram for illustrating an overall configuration of the data to be transmitted. As illustrated in FIG. 7, the data to be transmitted includes the header portion, the trace data, and the primary analysis data. An order of the trace data and the primary analysis data may be switched. The data to be transmitted is divided into portions each having a predetermined data length. Each of the divided portions of data is transmitted each time. For example, when the "response 8" of the data format shown in FIG. 5 is used to transmit the data to be transmitted, the "response 8" includes four bytes, and four bytes of the data to be transmitted is thus transmitted each time.

The data stored in the data storage 300 is not limited to the above-mentioned example. For example, the data storage 300 may store basic information (such as an apparatus name and an IP address) on the controller 20. Moreover, for example, the data storage 300 may store the trace data and the primary analysis data during the generation, and may store finished data to be transmitted. The data to be transmitted that has been transmitted may be deleted from the data storage 300, or may be retained in the data storage 300.

[Operation Control Module]

The operation control module 301 is configured to control the operation of the motor 40 based on the command from the controller 20. The operation control module 301 executes an operation corresponding to the command based on the control program. For example, the operation control module 301 controls electric power supplied to the motor 40 such that the motor 40 rotates or moves toward a direction or at a speed corresponding to the command. The operation control module 301 generates a response including the physical quantity detected by the sensor 50. The operation control module 301 generates the trace data storing the physical quantity detected by the sensor 50 in the form of a time series. The operation control module 301 applies the predetermined calculation processing to the trace data, to thereby generate the primary analysis data. The operation control module 301 adds the header portion to the trace data and the primary analysis data, to thereby generate the data to be transmitted. The header portion includes information, for example, the IP address of the controller 20.

[Transmission Module]

The transmission module 302 is configured to transmit any data to the controller 20. The transmission module 302 uses each of a plurality of periodic regions in one period to transmit data on itself to the controller 20.

The plurality of periodic regions in one period are a plurality of periodic regions included in one period. In this embodiment, description is given of a case in which all of the motor control apparatus 30 include a plurality of periodic regions, but there may exist a motor control apparatus 30 including only one periodic region. For example, a case in which one motor control apparatus 30 uses the periodic communication to transmit a plurality of pieces of data each having the data format of FIG. 5 corresponds to a case in which a plurality of periodic regions exist in one period. When the periodic region does not mean a data region but means a period, a case in which one motor control apparatus 30 transmits the data having the data format of FIG. 5 in each of the plurality of periods existing in one period corresponds to a case in which a plurality of periodic regions exist in one period.

The use of the periodic region is to store data in a part or the whole of the periodic region. When the periodic region does not mean a data region but means a period, the transmission of data in a part or the whole of the periodic region corresponds to the use of the periodic region. "Itself" means the motor control apparatus 30 including the transmission module 302. The data to be transmitted illustrated in FIG. 7 is an example of "data on itself." Accordingly, a portion described as "data to be transmitted" can be replaced by "data on itself."

The "data on itself" is not limited to the data to be transmitted, and is only required to be data that can be generated or acquired by the motor control apparatus 30. For example, the "data on itself" is the trace data generated by the motor control apparatus 30, the analysis data obtained through the analysis by the motor control apparatus 30, or the machine data on a machine connected to the motor control apparatus 30. A pair of the trace data and the primary analysis data does not always correspond to the data to be transmitted, but only one thereof may correspond to the data to be transmitted. The machine data is only required to be any information on the machine, and is, for example, a name, a model number, and a serial number of the machine and setting information (firmware, parameters, or the like) on the machine. The program and the parameters stored in the motor control apparatus 30 or a name, a model number, or a serial number of the motor control apparatus 30 may correspond to the "data on itself."

Data stored in one periodic region corresponding to one motor control apparatus 30 and data stored in another periodic region corresponding to the same motor control apparatus 30 may be the same as each other, or may be different from each other. Those pieces of data are only required to be data on the motor control apparatus 30. For example, the data for control may be stored in the periodic region corresponding to the real motor control apparatus 30, and a part or the whole of the trace data may be stored in the periodic region corresponding to the virtual motor control apparatus 30. Moreover, for example, the data for control and a part of the trace data may be stored in the periodic region corresponding to the real motor control apparatus 30, and another part of the trace data may be stored in the periodic region corresponding to the virtual motor control apparatus 30.

In this embodiment, the transmission module 302 uses each of the plurality of periodic regions including the periodic region for the motor control apparatus 30 and the periodic region for the virtual motor control apparatus 30 corresponding to the motor control apparatus 30. The virtual motor control apparatus 30 is a motor control apparatus 30 that does not actually exist. As viewed from the controller 20, the real motor control apparatus 30 and the virtual motor control apparatus 30 corresponding to the real motor control apparatus 30 exist. The virtual motor control apparatus 30 is only required to be implemented through use of a virtual machine technology. For example, an IP address (or other address information for identifying an object) for the real motor control apparatus 30 and an IP address for the virtual motor control apparatus 30 are assigned to one motor control apparatus 30. Moreover, for example, only one IP address may be assigned to one motor control apparatus 30. In this case, an apparatus name for a real motor control apparatus 30 and an apparatus name for a virtual motor control apparatus 30 are assigned.

The transmission module 302 may complete the transmission of the data to be transmitted in one period, or may divide one piece of data to be transmitted into portions and transmit each of the divided portions in each of a plurality of periodic regions. "Dividing the data into portions and transmitting each of the divided portions of the data in each of the plurality of periods" is to use the plurality of periods to transmit the data to be transmitted. In other words, transmission of the data to be transmitted over the plurality of periods corresponds to dividing the data into portions and transmitting each of the divided portions of the data in each of the plurality of periods. The transmission module 302 transmits a part of the data to be transmitted in some periods, and transmits the rest of the data to be transmitted in other periods. For example, the transmission module 302 divides the data to be transmitted into a plurality of portions, and transmits each of the divided portions of the data in each period.

The transmission module 302 divides the data to be transmitted based on the data size of the region to store the data. For example, when the entire periodic region corresponding to the virtual motor control apparatus 30 is used to transmit the data to be transmitted, the data format shown in FIG. 5 has 32 bytes, and the transmission module 302 thus divides the data to be transmitted into portions each having 32 bytes. In this case, the transmission module 302 transmits one of the divided portions of data in one period. The transmission module 302 may use a part of regions of the periodic region to transmit the data to be transmitted. In this case, the data to be transmitted is only required to be divided in accordance with the data size of the part to be used of the periodic region.

The transmission module 302 uses the periodic region to transmit the data to be transmitted at any timing after the data to be transmitted has been generated. For example, handshake is executed between the controller 20 and the motor control apparatus 30 after the data to be transmitted has been generated, and the transmission module 203 uses the periodic region to transmit the data to be transmitted after the handshake has been executed. The data to be transmitted may be transmitted at another timing. For example, the data may be transmitted at a timing at which a predetermined command is received from the controller 20 or a timing at which a predetermined time arrives.

In this embodiment, at least one of the plurality of periodic regions is used to transmit and receive data for control between the controller 20 and the motor control apparatus 30 at least once in one period. The data for control is data directly relating to the control of the motor control apparatus 30. For example, the command relating to the direction and the speed of the motor 40 is an example of the data for control. In the communication procedure of FIG. 2, the periodic region is used to transmit and receive the data for control once per motor control apparatus 30 in one period. The transmission and reception correspond to the transmission of the data for control by the controller 20 and the reception of the data for control by the motor control apparatus 30. The transmission and reception of the data for control and the transmission and reception of the data to be transmitted including the trace data and the primary analysis data are executed in parallel between the controller 20 and the motor control apparatus 30.

In this embodiment, the controller 20 sequentially communicates to and from the plurality of the motor control apparatus 30 in one period. When a turn of the transmission module 302 of each of the plurality of motor control apparatus 30 comes, the transmission module 302 uses the periodic regions having a number corresponding to the motor control apparatus 30 to transmit the data on itself. As described above, it is assumed that the order of the communication to and from the motor control apparatus 30 is described in a program, for example, the control program. The periodic region corresponding to itself means a periodic region to be used by the motor control apparatus 30 including the transmission module 302 to transmit data through the periodic communication.

For example, the transmission module 302 uses each of the plurality of periodic regions to transmit a plurality of types of data. In this embodiment, the types of data included in the data to be transmitted are specified by the operation control module 201, and the transmission module 302 thus transmits data of the specified types to the controller 20. Data of types not specified by the operation control module 201 is not transmitted to the controller 20. For example, the transmission module 302 uses a certain periodic region to transmit data of a certain type, and uses another periodic region to transmit data of another type. Moreover, for example, the transmission module 302 transmits data of a plurality of types in a mixed form in each of a plurality of periodic regions.

Moreover, in this embodiment, the operation control module 201 specifies a region for storing each of the portions of the data obtained by dividing the data to be transmitted. The transmission module 302 thus uses the specified at least one region to transmit the data to the controller 20. Regions that are not specified by the operation control module 201 are not used to transmit the data to be transmitted.

[Reception Module]

The reception module 303 is configured to receive any data from the controller 20. For example, the reception module 303 receives data indicating the content of the command generated by the operation control module 201 from the controller 20. The reception module 303 receives data including the identification information on the types specified by the type specification module 202 from the controller 20. The reception module 303 receives data including the identification information on the regions specified by the region specification module 203 from the controller 20. In the communication phase for the periodic communication, the reception module 303 receives the data stored in the periodic region from the controller 20. In the communication phase for the non-periodic communication, the reception module 303 receives the data stored in the non-periodic region from the controller 20.

4. Processing to be Executed in Production System

Figure 8:
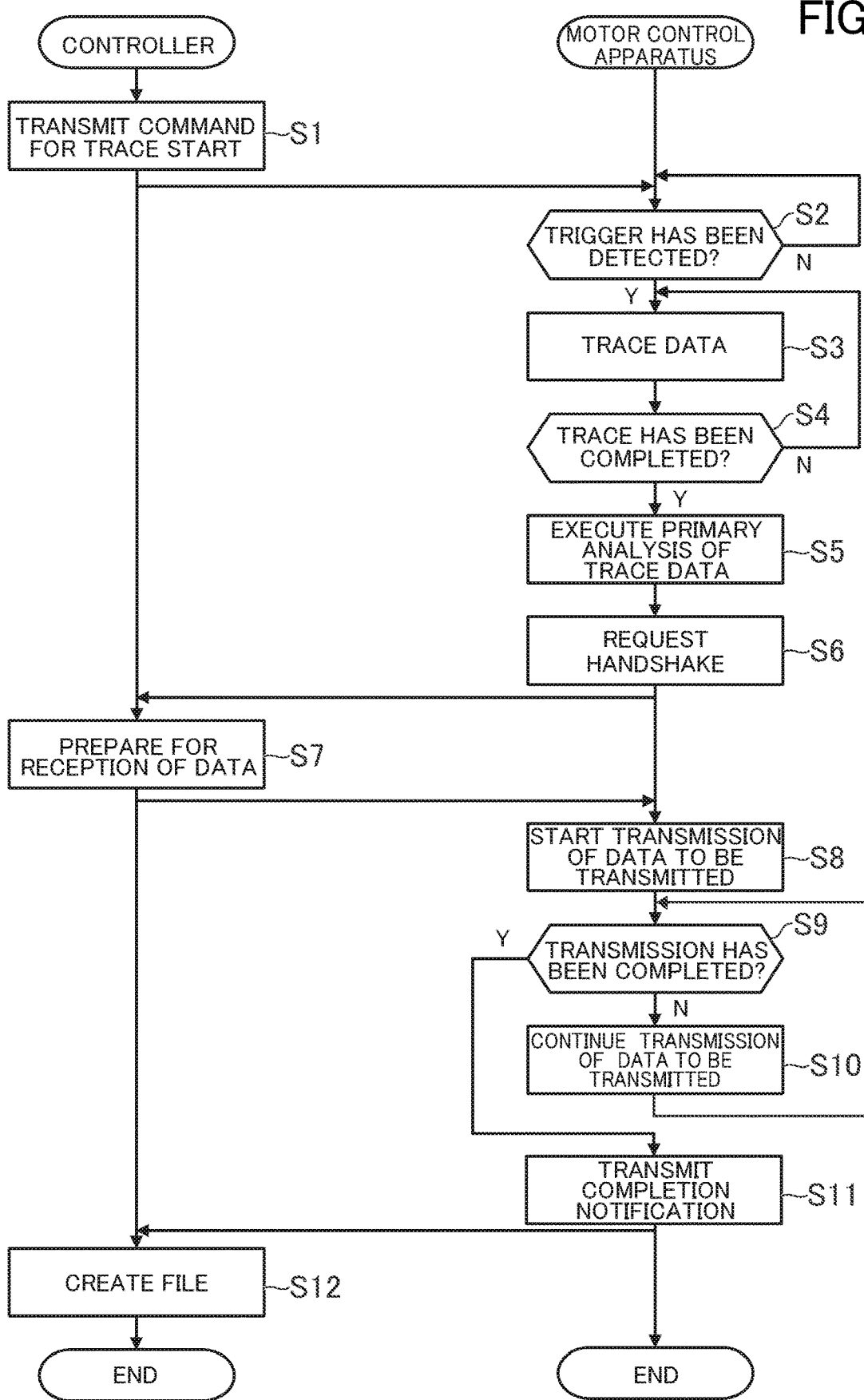
FIG. 8 is a flowchart for illustrating a form of transmission and reception of data to be transmitted in the production system.

FIG. 8 is a flowchart for illustrating a form of the transmission and the reception of the data to be transmitted in the production system 1. The processing illustrated in FIG. 8 is executed by the CPU 21 and the CPU 31 operating in accordance with the programs stored in the storage 22 and the storage 32, respectively. The processing described below is an example of processing executed by the functional blocks illustrated in FIG. 4. In FIG. 8, only one motor control apparatus 30 is illustrated, but the same processing is executed by each of the plurality of motor control apparatus 30. Moreover, in FIG. 8, the processing executed by the motor control apparatus 30 to control the motor 40 is omitted.

As illustrated in FIG. 8, first, the controller 20 transmits a command for starting the trace to the motor control apparatus 30 (Step S1). The command for the trace start is data having a form defined in advance, and includes, for example, the identification information on the type of data to be traced. In Step S1, the controller 20 executes the control program to determine the type of data to be traced, and transmits the command including the identification information on the determined type. When conditions such as a trigger of the trace start and a trace time period are set, it is assumed that those conditions are included in the command transmitted in Step S1. It is also assumed that those conditions are stored in the storage 22.

When the motor control apparatus 30 receives the command for the trace start, the motor control apparatus 30 determines whether or not a predetermined trigger has been detected (Step S2). The trigger is a condition for the trace start. Any trigger can be set as the trigger. For example, a condition that an alarm occurs, a condition that the physical quantity detected by the sensor 50 reaches a predetermined value, or a condition that the current time becomes a predetermined time can be set as the trigger. The trigger may be determined in advance, or may be included in the command transmitted in Step S1. In Step S2, the motor control apparatus 30 determines whether or not the trigger has been detected based on a detection signal of the sensor 50 or the timer stored in the storage 32.

When the trigger has been detected (Y in Step S2), the motor control apparatus 30 traces the data of the type included in the command for the trace start based on the detection signal of the sensor 50 (Step S3). In Step S3, the motor control apparatus 30 stores the physical quantity detected by the sensor 50 in the trace data in the form of a time series. For example, the motor control apparatus 30 associates the physical quantity detected by the sensor 50 with the current time, and stores the associated physical quantity in the trace data.

The motor control apparatus 30 determines whether or not the trace has been completed (Step S4). A condition for the trace completion may be any condition. For example, a condition that a certain time period has elapsed since the start of trace, a condition that the alarm stops, or a condition that the physical quantity detected by the sensor 50 reaches a predetermined value can be the condition for the trace completion. In Step S4, the motor control apparatus 30 determines whether or not the trace has been completed based on the timer stored in the storage 32, the detection signal of the sensor 50, or the size of the trace data.

When the motor control apparatus 30 does not determine that the trace has been completed (N in Step S4), the motor control apparatus 30 returns to the processing in Step S3, and the trace is continued. Meanwhile, when the motor control apparatus 30 determines that the trace has been completed (Y in Step S4), the motor control apparatus 30 executes the primary analysis of the trace data (Step S5). In the primary analysis, it is only required to execute analysis in accordance with the trace data. It is assumed that a program for the primary analysis is stored in the storage 32 in advance. In Step S5, the motor control apparatus 30 executes this program, to thereby execute the primary analysis of the trace data. The motor control apparatus 30 generates primary analysis data based on an execution result of the primary analysis, and stores the primary analysis data in the storage 32. The motor control apparatus 30 adds the header portion to the trace data and the primary analysis data, to thereby generate the data to be transmitted.

The motor control apparatus 30 requests the controller 20 for the handshake with the motor control apparatus 30 (Step S6). The request for the handshake is executed through transmission of data having form defined in advance. When the controller 20 receives the request for the handshake, the controller 20 executes the handshake with the motor control apparatus 30, and prepares for the reception of the data (Step S7). In Step S7, the motor control apparatus 30 is only required to execute the handshake by following a procedure defined in a communication protocol.

The motor control apparatus 30 starts transmitting the data to be transmitted to the controller 20 (Step S8). For example, when the handshake has been completed, the controller 20 transmits, to the motor control apparatus 30, a command indicating that the data to be transmitted is requested. The motor control apparatus 30 divides the data to be transmitted into portions each having the number of bytes (32 bytes in the format of FIG. 5) of the periodic region corresponding to the virtual motor control apparatus 30. The motor control apparatus 30 stores each of the divided data portions in the periodic region corresponding to the virtual motor control apparatus 30. When only a part of the periodic region corresponding to the virtual motor control apparatus 30 is used to transmit the data to be transmitted, the motor control apparatus 30 may store the data for control in other portions of the periodic region.

The motor control apparatus 30 determines whether or not the transmission of the data to be transmitted has been completed (Step S9). In Step S9, the motor control apparatus 30 determines whether or not the transmission has been completed up to the last data portion of the data to be transmitted.

When it is not determined that the transmission of the data to be transmitted has been completed (N in Step S9), the motor control apparatus 30 continues the transmission of the data to be transmitted (Step S10), and returns to the processing in Step S9. In Step S10, each time the period arrives, the controller 20 transmits the command for control to the real motor control apparatus 30. The real motor control apparatus 30 receives the command for control, executes the command for control, and transmits the response for control to the controller 20. Moreover, the controller 20 transmits, to the virtual motor control apparatus 30, the command for instructing the transmission of the data to be transmitted. The virtual motor control apparatus 30 receives the command, executes the command, stores, in each of the specified regions of the periodic region, each piece of data obtained by dividing the data to be transmitted into portions, and transmits the piece of data to the controller 20. Subsequently, the execution of the command and the data transmission using the periodic region is continued until the transmission of the data to be transmitted is completed.

Meanwhile, when it is determined that the transmission of the data to be transmitted has been completed (Y in Step S9), the motor control apparatus 30 executes predetermined completion processing, to thereby transmit a completion notification for the data transmission to the controller 20 (Step S11). The completion processing is executed by transmitting data having a form defined in advance. For example, the completion notification is executed by transmitting a character string indicating that an end of the data to be transmitted has been reached.

When the controller 20 receives the completion notification, the controller 20 generates a file based on the data which has been received up to the reception of the completion notification (Step S12), and this processing is finished. In Step S12, the controller 20 reassembles the portions of data received from the motor control apparatus 30 into one piece of data, and records the reassembled data as a file in the storage 22. The controller 20 may transmit the file recorded in the storage 22 to the data collection apparatus 10. The data collection apparatus 10 receives the file, and records the file in the storage 12. The data collection apparatus 10 may analyze the file recorded in the storage 12, or may instruct the controller 20 to correct the control content or to recover from a failure based on the primary analysis data included in the file.

According to the production system 1 of this embodiment, the time period required to transmit the data to be transmitted can be guaranteed by transmitting, to the controller 20, the data to be transmitted through use of each of the plurality of periodic regions in one period. For example, the data to be transmitted may be transmitted through use of the non-periodic region, but the non-periodic region may be used for communication for other industrial machines, or may be used to transmit other data, and the time period required to transmit the data to be transmitted may be unstable. With this respect, the periodic region is the dedicated communication region provided for the motor control apparatus 30, and hence the time period required to transmit the data to be transmitted can be stabilized. As a result, the time period required to transmit the data to be transmitted can be reduced.

Moreover, the data for control is transmitted and received between the controller 20 and the motor control apparatus 30 at least once in each period through use of at least one of the plurality of periodic regions, and the data to be transmitted is thus transmitted while the data for control is received and transmitted, thereby being capable of effectively using the periodic region. For example, when the entire periodic region is used to transmit the data to be transmitted, the data for control cannot be transmitted, and the operation may be interfered with. However, the data for control is transmitted at least once in each period, thereby being capable of preventing the operation from being interfered with.

Moreover, the production system 1 can guarantee the time period required to transmit the data to be transmitted through use of each of the plurality of periodic regions including the periodic region for the motor control apparatus 30 and the periodic region for the virtual industrial machine corresponding to the motor control apparatus 30. For example, when there is defined such a rule that one periodic region is assigned to each apparatus in one period, a plurality of periodic regions can substantially be assigned to the motor control apparatus 30 without changing the rule through use of the periodic region for the virtual industrial machine.

Moreover, in the production system 1, each of the plurality of motor control apparatus 30 uses the periodic region corresponding to itself to transmit the data to be transmitted on itself when the own turn for the communication arrives. Consequently, even when the production system. 1 includes a plurality of motor control apparatus 30, the time period to transmit the data to be transmitted can be guaranteed. The periodic regions having a number corresponding to the motor control apparatus 30 exist in one period, and communication in accordance with the motor control apparatus 30 can thus be achieved. For example, a large number of periodic regions are assigned to the motor control apparatus 30 that transmits data having a relatively large size, thereby being capable of increasing efficiency of the transmission of the data.

Moreover, the production system 1 uses each of a plurality of periodic regions to transmit data of a plurality of types, thereby being capable of transmitting various data.

Moreover, the production system 1 divides one piece of data into portions, and transmits each of the divided portions of the data in each of a plurality of periodic regions, thereby being capable of guaranteeing the time period required to even transmit data to be transmitted that is not fitted to one periodic region. Moreover, the time period required to transmit the data to be transmitted can be reduced through use of the plurality of periodic regions.

5. Modification Examples

The present disclosure is not limited to the embodiment described above, and can be modified suitably without departing from the spirit of the present disclosure.

Figure 9:
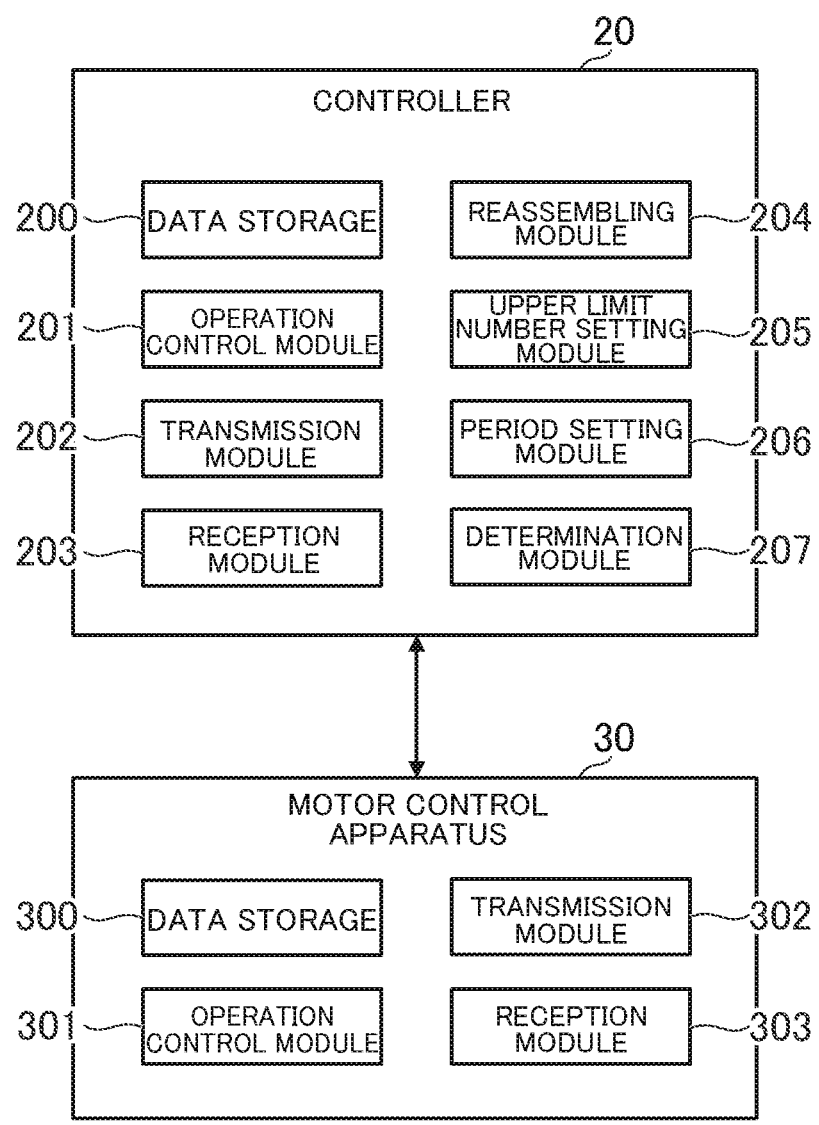
FIG. 9 is a functional block diagram of modification examples.

FIG. 9 is a functional block diagram of modification examples. As illustrated in FIG. 9, in the modification examples described below, a reassembling module 204, an upper limit number setting module 205, a period setting module 206, and a determination module 207 are implemented in the controller 20. Those functions are mainly implemented by the CPU 21.

(1) For example, when the data to be transmitted is not fitted to the periodic region corresponding to the virtual motor control apparatus 30 as described in this embodiment, the data to be transmitted is divided into portions, and each of the divided portions is transmitted in each of a plurality of periodic regions. The plurality of periodic regions may exist in one period, or may exist across a plurality of periods. For example, when it is considered that a plurality of virtual motor control apparatus 30 exist for one motor control apparatus 30 (that is, when one motor control apparatus 30 is considered as a plurality of slave machines), the data to be transmitted may be divided into portions, and each of the divided portions is transmitted in each of a plurality of periodic regions corresponding to each of the plurality of virtual motor control apparatus 30. In this case, identification information may be assigned to the data portion divided for each of the plurality of periodic regions.

The identification information is only required to be information that allows identification of the data to be transmitted, and is expressed as a character string, for example, a name of the data to be transmitted. The controller 20 may identify to which data to be transmitted the divided data belongs based on the identification information, and may reassemble the divided data. The identification information may be generated by the controller 20, or may be generated by the motor control apparatus 30.

The reassembling module 204 reassembles, based on the identification information, the respective data portions received through use of the plurality of periodic regions. Each of the data portions forming the data to be transmitted is transmitted in each of a plurality of periodic regions, and hence the reassembling module 204 determines that those data portions are parts of the same data to be transmitted based on the identification information assigned to each of the data portions, and reassembles the data portions into one file.

According to Modification Example (1), the controller 20 reassembles the respective pieces of data received through use of each of the plurality of periodic regions based on the identification information on the data to be transmitted, thereby being capable of unifying pieces of data to be transmitted separately received into one piece of data.

(2) Moreover, for example, when the number of periodic regions increases, the communication to and from all of the motor control apparatus 30 may not be completed in one period. To deal with this problem, the number of opposite parties of communication of the controller 20 may be limited in accordance with the number of periodic regions. The controller 20 in Modification Example (2) includes the upper limit number setting module 205. The upper limit number setting module 205 is configured to set an upper limit number of opposite parties of communication based on the number of periodic regions used by the transmission modules 302.

The number of periodic regions used by the transmission modules 302 is the number of periodic regions existing in one period. For example, when each of all of the motor control apparatus 30-1 to 30-*n* is considered as two slave machines, the number of periodic regions used by the transmission modules 302 is 2n. Moreover, for example, when only the motor control apparatus 30-1 is considered as two slave machines, the number of periodic regions used by the transmission modules 302 is n+1.

It is assumed that a relationship between the number of periodic regions used by the transmission modules 302 and the upper limit number of opposite parties of communication is stored in the data storage 200 in advance. This relationship may be data having a form of a numerical expression or a table form, or may be described as a part of a programing code. The upper limit number setting module 205 sets a smaller upper limit number of opposite parties of communication as the number of periodic regions used by the transmission modules 302 increases. For example, when a predicted communication period for one periodic region is "t", the upper limit number of opposite parties of communication is set such that a value obtained by multiplying the number of periodic regions used by the transmission modules 302 by "t" does not exceed the upper limit number defined for the communication phase for the periodic communication illustrated in FIG. 2 and FIG. 3.

According to Modification Example (2), it is possible to prevent, by setting the upper limit number of opposite parties of communication of the controller 20 based on the number of periodic regions used by the motor control apparatus 30, the communication to and from the opposite parties of communication from not being finished within the period. Moreover, it is possible to prevent, by setting the upper limit number of opposite parties of communication, a communication amount in one period from excessively increasing, and it is thus possible to reduce a communication load.

(3) Moreover, for example, in Modification Example (2), the number of opposite parties of communication is limited in accordance with the number of periodic regions used by the transmission modules 302, but the duration T of the period may be set in accordance with the number of periodic regions used by the transmission modules 302. The controller 20 in Modification Example (3) includes the period setting module 206. The period setting module 206 is configured to set the duration of the period based on the number of periodic regions used by the transmission modules.

It is assumed that a relationship between the number of periodic regions used by the transmission modules 302 and the duration T of the period is stored in the data storage 200 in advance. This relationship may be data having a form of a numerical expression or a table form, or may be described as a part of a programing code. The period setting module 206 sets a longer duration T of the period as the number of periodic regions used by the transmission modules 302 increases. For example, when the predicted communication period for one periodic region is "t", the duration T of the period is set so as to be equal to or longer than a period obtained by multiplying the number of periodic regions used by the transmission module 302 by "t".

According to Modification Example (3), the period can have, by setting the duration of the period based on the number of periodic regions used by the motor control apparatus 30, a duration sufficient for the controller 20 to communicate to and from all of the opposite parties of communication. Consequently, it is possible to prevent the communication between the controller 20 and the opposite parties of communication from not being finished within the period.

(4) Moreover, for example, the number of periodic regions used by the transmission modules 302 may be set so as to be fitted to the duration T of one period. The controller 20 in Modification Example (4) includes the determination module 207. The determination module 207 is configured to determine the number of periodic regions used by the transmission modules 302 based on the duration of the period in the periodic communication.

It is assumed that a relationship between the duration T of the period and the number of periodic regions used by the transmission modules 302 is stored in the data storage 200 in advance. This relationship may be data having a form of a numerical expression or a table form, or may be described as a part of a programing code. The determination module 207 determines the number of periodic regions such that the number of periodic regions used by the transmission modules 302 increases as the duration T of the period increases. For example, when the predicted communication period for one periodic region is "t", the number of periodic regions is set such that the value obtained by multiplying the number of periodic regions used by the transmission module 302 by "t" does not exceed the duration T of the period.

According to Modification Example (4), it is possible to prevent, by determining the number of periodic regions used by the motor control apparatus 30 based on the duration of the period in the periodic communication, the number of periodic regions that cannot be fitted to one period from being set. For example, when as many periodic regions as those can be fitted to one period are used, the efficiency of the transmission of the data can be increased.

(5) Moreover, for example, the above-mentioned modification examples may be combined with one another.

Further, for example, in the embodiment, description is given of the case in which the controller 20 considers one motor control apparatus 30 as the real motor control apparatus 30 and the virtual motor control apparatus 30, but the controller 20 may not particularly consider the motor control apparatus 30 as the virtual motor control apparatus 30. For example, the controller 20 may transmit and receive the command and the response a plurality of times to and from one motor control apparatus 30 in the communication phase for the periodic communication. Moreover, for example, the controller 20 may transmit and receive the command and the response a plurality of times to and from not all of the motor control apparatus 30 but only a specific motor control apparatus 30. For example, a plurality of periodic regions may exist in one period only for each of motor control apparatus 30 that have completed generation of transmission control data. In this case, the controller 20 may execute the periodic communication a plurality of times in one period only for motor control apparatus 30 from which the request for handshake in Step S6 of FIG. 8 have been received.

Further, for example, description is given above of the case in which the data to be transmitted by the motor control apparatus 30 to the controller 20 is transmitted through use of each of the plurality of periodic regions, but the data to be transmitted by the controller 20 to the motor control apparatus 30 may be transmitted through use of each of the plurality of periodic regions. For example, the controller 20 may not use the non-periodic communication but may use each of the plurality of periodic regions to transmit data, for example, the parameters, to the motor control apparatus 30. That is, not only when the data is transmitted from the slave machine to the master machine, but also when the data is transmitted from the master machine to the slave machine, the data may be transmitted through use of each of the plurality of periodic regions as in the flow described in the embodiment.

Moreover, for example, description is given above of the case in which the periodic communication is used between the controller 20 and the motor control apparatus 30, and the data to be transmitted is divided into portions and each of the divided portions of the data is transmitted in each of the plurality of periods, but the same communication may be executed between other industrial machines. When the periodic communication is executed between the motor control apparatus 30 and the sensor 50, data to be transmitted that is generated by the sensor 50 may be transmitted to the motor control apparatus 30 through use of each of the plurality of periodic regions. Moreover, for example, the same communication as described above may be used for communication between a cell controller configured to manage a unit called "cell" and a robot controller. Further, the same communication as described above may be used for communication between a PLC and an apparatus to be controlled. Still further, for example, the network for industry is exemplified above, but the network is only required to be a network capable of executing the periodic communication, and the same communication as that described above may be executed on another network.

Further, the embodiment described above is given as a specific example, and is not to limit the invention disclosed herein to the very configuration and data storage examples of the specific example. A person skilled in the art may make various modifications to the disclosed embodiment with regard to, for example, the shapes and numbers of physical components, data structures, and execution orders of processing. It is to be understood that the technical scope of the invention disclosed herein encompasses such modifications. In other words, it should be understood by those skilled in the art that various modifications, combinations, sub-combinations and alterations may occur depending on design requirements and other factors insofar as they are within the scope of the appended claims or equivalents thereof.

What is claimed is:

1. A production system, comprising:
a first industrial machine; and
a second industrial machine configured to periodically communicate to and from the first industrial machine,
wherein the second industrial machine is configured to transmit its data to the first industrial machine through use of each of a plurality of periodic regions included in one period;
wherein the first industrial machine is capable of communicating to and from a plurality of opposite parties of communication in one period,
wherein the plurality of periodic regions exist for each of the plurality of opposite parties of communication in one period,
wherein the second industrial machine is configured to use each of the plurality of periodic regions including a periodic region for the second industrial machine and a periodic region for a virtual industrial machine which is a virtual version of the second industrial machine, and
wherein the period includes a plurality of non-periodic regions and the first industrial machine is configured to only communicate with a single opposite party during a non-periodic region.

2. The production system according to claim 1, wherein at least one of the plurality of periodic regions is used to transmit data for control at least once in one period between the first industrial machine and the second industrial machine.

3. The production system according to claim 2,
wherein the production system includes a plurality of second industrial machines,
wherein the first industrial machine is configured to sequentially communicate to and from the plurality of second industrial machines in one period, and
wherein each of the plurality of second industrial machines is configured to use periodic regions having a number corresponding to one of the plurality of second industrial machines to transmit data on the one of the plurality of second industrial machines when a turn corresponding to the one of the plurality of second industrial machines arrives.

4. The production system according to claim 2, wherein the second industrial machine is configured to transmit a plurality of types of data through use of each of the plurality of periodic regions.

5. The production system according to claim 1,
wherein the production system includes a plurality of second industrial machines,
wherein the first industrial machine is configured to sequentially communicate to and from the plurality of second industrial machines in one period, and
wherein each of the plurality of second industrial machines is configured to use periodic regions having a number corresponding to one of the plurality of second industrial machines to transmit data on the one of the plurality of second industrial machines when a turn corresponding to the one of the plurality of second industrial machines arrives.

6. The production system according to claim 5, wherein the second industrial machine is configured to transmit a plurality of types of data through use of each of the plurality of periodic regions.

7. The production system according to claim 1, wherein the second industrial machine is configured to transmit a plurality of types of data through use of each of the plurality of periodic regions.

8. The production system according to claim 1, wherein the second industrial machine is configured to divide one piece of data into data portions and transmit each of the divided data portions in each of the plurality of periodic regions.

9. The production system according to claim 8,
wherein each of the data portions divided for each of the plurality of periodic regions has identification information assigned thereto, and
wherein the first industrial machine is configured to reassemble, based on the identification information, the data portions each received through use of each of the plurality of periodic regions.

10. The production system according to claim 1,
wherein the first industrial machine is capable of communicating to and from a plurality of opposite parties of communication, and
wherein the production system further comprises circuitry configured to set an upper limit number of opposite parties of communication based on a number of periodic regions used by the transmission module.

11. The production system according to claim 1, further comprising circuitry configured to set a duration of the one period based on the number of periodic regions used by the transmission module.

12. The production system according to claim 1, further comprising circuitry configured to determine a number of periodic regions used by the transmission module based on a duration of the one period in a periodic communication.

13. The production system according to claim 1, wherein the data is trace data generated by the second industrial machine, analysis data obtained through analysis by the second industrial machine, or machine data on a machine connected to the second industrial machine.

14. The production system according to claim 1,
wherein the first industrial machine is configured to transmit a command, and
wherein the second industrial machine is configured to operate in accordance with the command.

15. The production system according to claim 1,
wherein the production system includes a plurality of second industrial machines,
wherein the first industrial machine is configured to sequentially communicate to and from the plurality of second industrial machines in one period, and
wherein each of the plurality of second industrial machines is configured to use periodic regions having a number corresponding to one of the plurality of second industrial machines to transmit data on the one of the plurality of second industrial machines when a turn corresponding to the one of the plurality of second industrial machines arrives.

16. The production system according to claim 1, wherein the second industrial machine is configured to transmit a plurality of types of data through use of each of the plurality of periodic regions.

* * * * *